United States Patent
Mally

(10) Patent No.: US 7,387,269 B2
(45) Date of Patent: Jun. 17, 2008

(54) DRIVE COUPLER FOR A FOOD PREPARATION DEVICE

(75) Inventor: Kenneth P. Mally, Grand Rapids, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 287 days.

(21) Appl. No.: 11/083,754

(22) Filed: Mar. 18, 2005

(65) Prior Publication Data
US 2006/0208119 A1    Sep. 21, 2006

(51) Int. Cl.
B02C 1/08    (2006.01)

(52) U.S. Cl. ...................... 241/282.1; 241/92

(58) Field of Classification Search ............... 241/91, 241/92, 282.1, 261.2, 261.3, 282.2, 57, 284, 241/188.1, 281.1; 366/199, 205
See application file for complete search history.

(56) References Cited

U.S. PATENT DOCUMENTS 4,087,053 A * 5/1978 Voglesonger ............ 241/282.1
6,000,650 A * 12/1999 Penaranda et al. ....... 241/282.1
6,910,800 B2 * 6/2005 Wu .......................... 366/199

FOREIGN PATENT DOCUMENTS

DE    2357025    5/1975
FR    1396468    4/1965

* cited by examiner

Primary Examiner—Faye Francis
(74) Attorney, Agent, or Firm—Tara M. Hartman; Michael D. Lafrenz

(57) ABSTRACT

A food preparation device has a base with a motor located within the base and having an output shaft defining a first axis of rotation. A jar is removably coupled with the base. A food processing assembly is coupled with the jar and has a drive shaft defining a second axis of rotation. A drive coupler comprises a splined socket coupled with one of the output shaft and the drive shaft, and a splined insert coupled with the other of the output shaft and the drive shaft. The splined insert is sized to be received within the splined socket when the jar is mounted to the base to operably couple the output shaft and the drive shaft, the splines of the splined insert having an arcuate profile.

17 Claims, 9 Drawing Sheets

DRIVE COUPLER FOR A FOOD PREPARATION DEVICE

BACKGROUND OF THE INVENTION

1. Field of the Invention

The invention relates generally to motor-driven food preparation devices, and more specifically to a coupling connecting a blender motor to a blender blade assembly which can accommodate misalignment of a blender jar with a blender base.

2. Description of the Related Art

Blenders are a common motor-driven appliance in home, commercial, and institutional kitchens. FIG. 1A illustrates in a sectional view a conventional prior art blender assembly 10 comprising a jar 12 and a motorized base 14. The jar 12 comprises a perimeter wall 20 and a bottom wall 44 which together define a chamber 22 adapted to hold a food item (not shown). The perimeter wall 20 transitions to a downwardly-extending skirt 24 which defines with the bottom wall 44 a skirt recess 40.

A rotating blade assembly 26 for processing food items in the chamber 22 is mounted to the jar 12. The blade assembly 26 comprises a bushing assembly 30 mounted within an opening in the bottom wall 44 of the jar 12 and a drive shaft 34 rotatably mounted to the bushing assembly 30 and defines an axis of rotation 42. A blade 28 is mounted to one end of the drive shaft 34 and a male coupler 32 is mounted to the other end of the drive shaft 34.

The motorized base 14 comprises a base housing 50 enclosing a drive motor 52. The armature of the drive motor 52 terminates in an output shaft 54 which mounts a female coupler 56. The output shaft 54 defines a second axis of rotation 64. The base housing 50 transitions upwardly to a jar pedestal 62 adapted for cooperative registry with the skirt recess 40 when the jar 12 is seated on the base 14.

Referring to FIG. 1B, the male coupler 32 is a disk-shaped, gear-like body having a circumscribing perimeter surface 36 that ends in opposing upper and lower edges 46, 48, respectively, having a plurality of regularly-spaced longitudinal splines 38 having tips that form the perimeter surface.

The female coupler 56 is a somewhat cup-shaped body having a circumferential inner surface 58 from which project a plurality of regularly-spaced longitudinal splines 60, which are complementary to the splines 38 on the male coupler for cooperative registry with the male coupler 32 to effect rotation of the mixing blades 28 by rotation of the drive motor 52.

When the jar 12 is properly seated on the motorized base 14, the jar pedestal 62 will be received in the skirt recess 40 so that the drive shaft rotational axis 42 and the output shaft rotational axis 64 are coaxial. However, in some instances, the jar 12 may be unintentionally seated on the motorized base 14 so that the blade assembly rotational axis 42 is misaligned relative to the drive motor rotational axis 64 as seen in FIGS. 1A and 1B. This misalignment will cause the male coupler 32 to improperly seat in the female coupler 56, resulting in the upper and lower edges 46, 48 of the male coupler 32 contacting the inner surface of the female coupler 56 as the tip of each male coupler spline 38 is received between adjacent female splines 60. The misalignment results in asymmetric rotation of the male coupler 32 relative to the female coupler 56 and the contacting of the edges 46, 48 with the inner surface 58 causes excessive vibration and noise, as well as accelerated wear of the couplers 32, 56.

SUMMARY OF THE INVENTION

In one embodiment the invention relates to a food preparation device comprising a base comprising a motor located within the base and having an output shaft defining a first axis of rotation. A jar is removably coupled with the base. A food processing assembly is coupled with the jar and has a drive shaft defining a second axis of rotation. A drive coupler comprises a splined socket coupled with one of the output shaft and the drive shaft, and a splined insert coupled with the other of the output shaft and the drive shaft. The splined insert is sized to be received within the splined socket when the jar is mounted to the base to operably couple the output shaft and the drive shaft, the splines of the splined insert having an arcuate profile.

DESCRIPTION OF AN EMBODIMENT OF THE INVENTION

Figure 2:
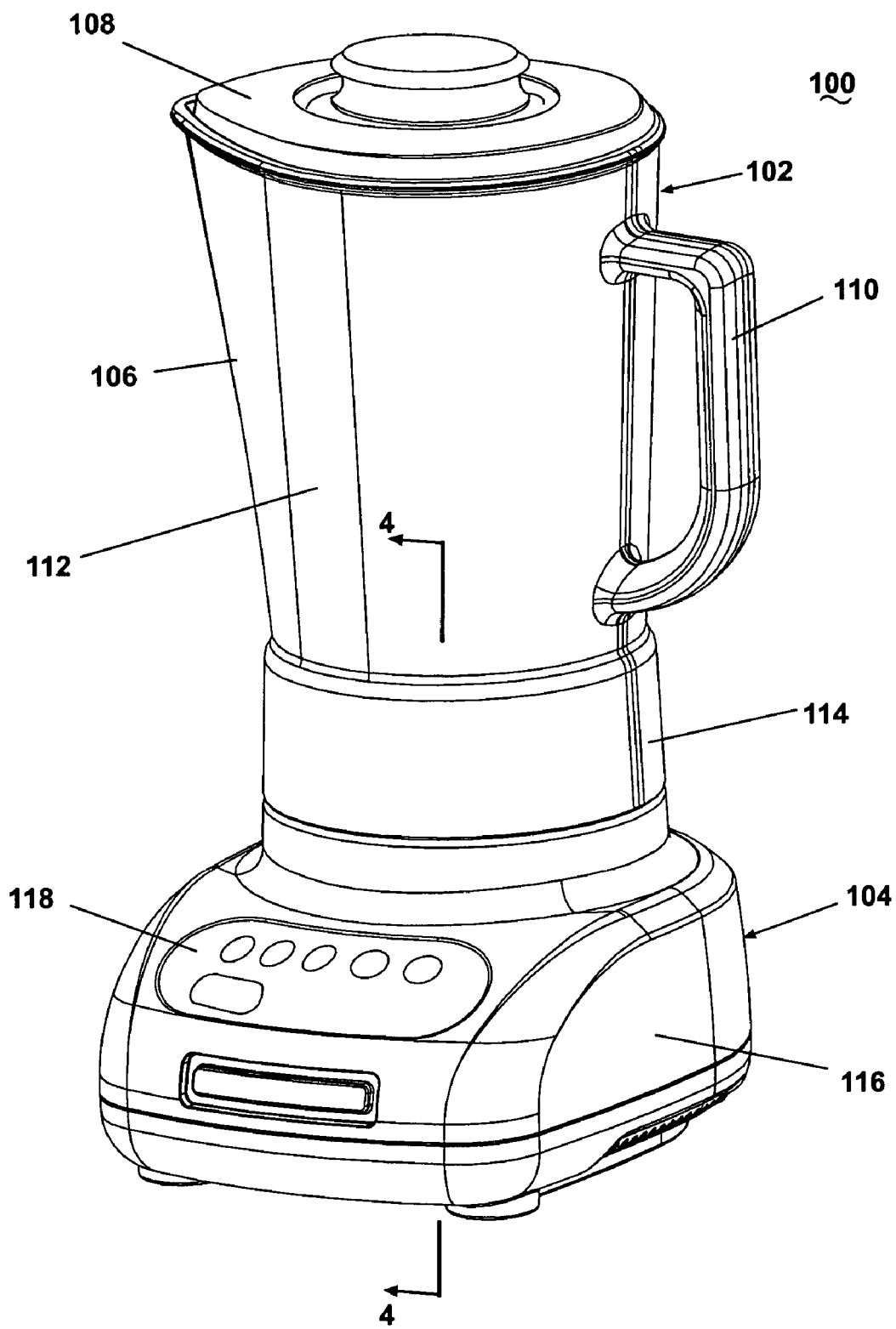
FIG. 2 is a perspective view of an embodiment of the invention comprising a blender having a jar removably attached to a motorized base.

Referring now to FIG. 2, an embodiment of the invention is illustrated comprising a blender 100. The blender 100 has standard elements common in the art. These common elements will not be described in detail except as necessary for a full understanding of the invention.

The blender 100 comprises a jar 102 and a motorized base 104. The jar 102 comprises a perimeter wall 112 from which extends a handle 110 to assist a user in maneuvering the jar 102 during use. A lid 108 closes the top of the jar 102.

Figure 3:
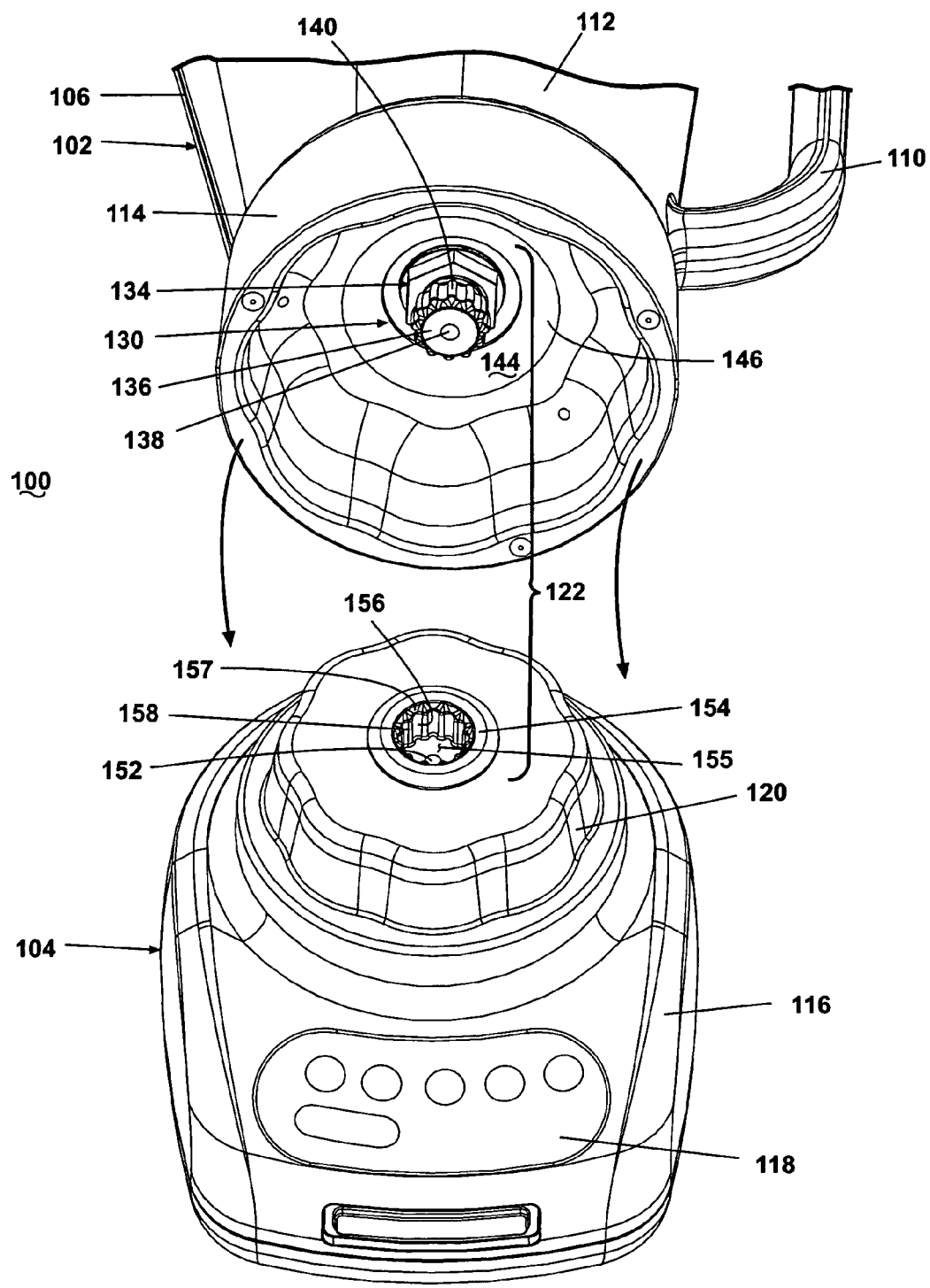
FIG. 3 is a perspective view of the blender illustrated in FIG. 2 showing a drive coupler for the one embodiment in the form of a male coupler extending from a lower portion of the jar and a complementary female coupler in the motorized base.

Referring to FIG. 3, the jar 102 is operably connected to the motorized base 104 through a drive coupler 122 comprising an arcuate male coupler 136 and a female coupler 154. The perimeter wall 112 transitions to a downwardly-extending skirt 114, which defines with a bottom wall 146 a skirt recess 144 into which extends the male coupler 136. The motorized base 104 comprises a base housing 116 having a control panel 118. The base housing 116 transitions upwardly to a jar pedestal 120 adapted for cooperative registry with the skirt recess 144 when the jar 102 is seated on the base 104. A female coupler 154 is accessible through an opening in the jar pedestal 120.

Figure 4:
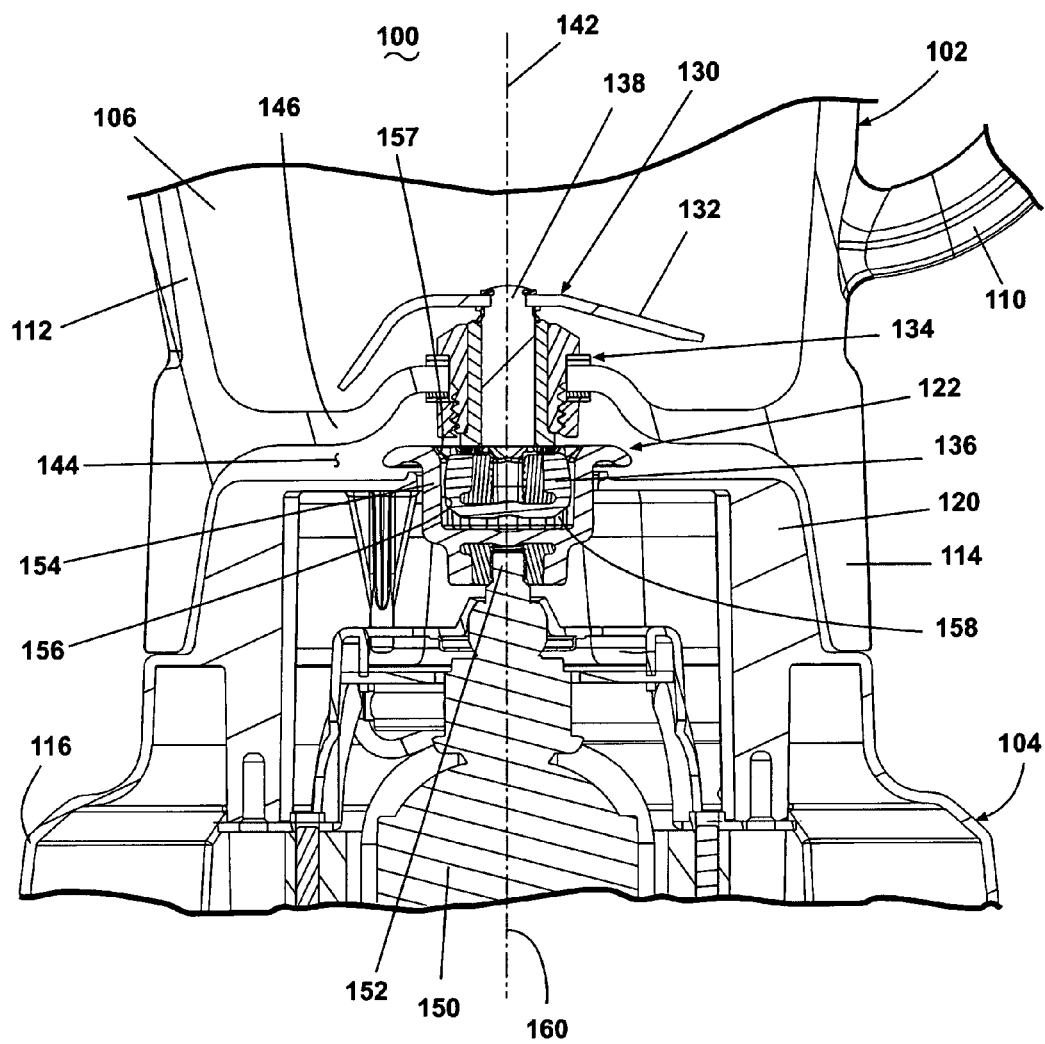
FIG. 4 is a sectional view of a portion of the blender taken along section line 4-4 of FIG. 2.

Referring to FIG. 4, the jar 102 defines a chamber 106 adapted to hold a food item (not shown). A food processing assembly, e.g. a rotating blade assembly 130, for processing food items in the chamber 106 is mounted in an aperture in a bottom wall 146 so that a first portion of the blade assembly 130 extends into the chamber 106 and a second portion of the blade assembly 130 extends into the skirt recess 144. The blade assembly 130 comprises a plurality of mixing blades 132 to facilitate mixing, liquefying, chopping, processing, etc., of food items as the blade assembly 130 rotates. A drive shaft 138 is rotatably mounted to the bushing assembly and defines a first axis of rotation 142. The mixing blades 132 are mounted to one end of the drive shaft 138 to locate the blades within the chamber 106. The male coupler 136 is mounted to the other end of the drive shaft 138 to locate the male coupler 136 in the skirt recess 144. A drive motor 150 is located within the base housing 116 and has an output shaft 152 on which the female coupler 154 is mounted for rotation therewith. The output shaft 152 defines a second axis of rotation 160.

The drive coupler 122 is described herein with respect to an embodiment comprising the male coupler 136 mounted to the jar 102 and the female coupler 154 mounted to the motorized base 104. However, the drive coupler 122 can also comprise the female coupler 154 mounted to the jar 102 and the male coupler 136 mounted to the base 104 without departing from the scope of the invention.

The male coupler 136 is fabricated of a material known to those skilled in the art having sufficient strength and durability for the purposes described herein. Preferably, the male coupler 136 fabrication material also has some resiliency to facilitate seating of the male coupler 136 in the female coupler 154, and to dampen vibration and noise during operation of the blender 100.

Figure 5:
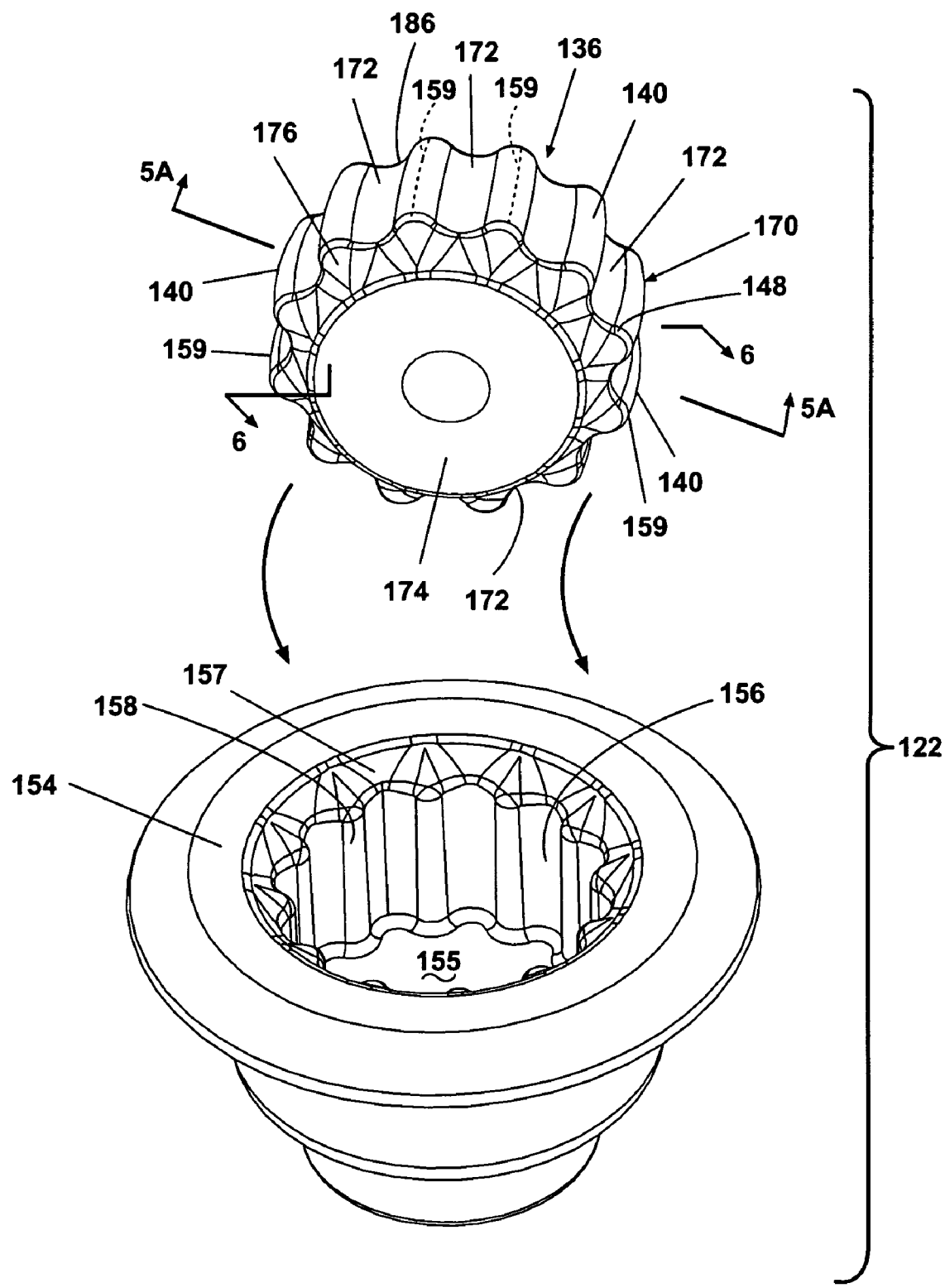
FIG. 5 is an enlarged perspective view of the male and female couplers illustrated in FIG. 4.

Referring to FIG. 5, the female coupler 154, also referred to herein as a splined socket, is a somewhat cup-shaped body having a circumferential inner surface 156 provided with a plurality of regularly-spaced longitudinal splines 158 and adapted for cooperative registry with the male coupler 136 to effect rotation of the mixing blades 132 with rotation of the drive motor 150. The inner surface 156 transitions upwardly through a beveled top edge 157 to define an opening 155 for receipt of the male coupler 136.

The arcuate male coupler 136, also referred to herein as a splined insert or "ball," comprises a somewhat flattened, circular, gear-like body having a circumscribing perimeter surface 170 separating a pair of parallel, planar, opposed circular top and bottom end walls 174, 186. A beveled wall 176 extends between the perimeter surface 170 and the bottom wall 174. The perimeter surface 170 is provided with a regularly-spaced array of longitudinal arcuate splines 140 alternating with regularly-spaced longitudinal arcuate recesses 172 which are adapted for cooperative registry with the splines 158 of the female coupler 154 when the arcuate male coupler 136 is inserted into the female coupler 154. The splines 140 terminate in a tip 159, which extends medially along the spline 140 in a longitudinal arcuate line.

The beveled wall 176 on the male coupler 136 and the beveled top edge 157 on the female coupler 154 facilitate the alignment and insertion of the male coupler 136 in the female coupler 154, and are not essential to the invention.

Figure 6:
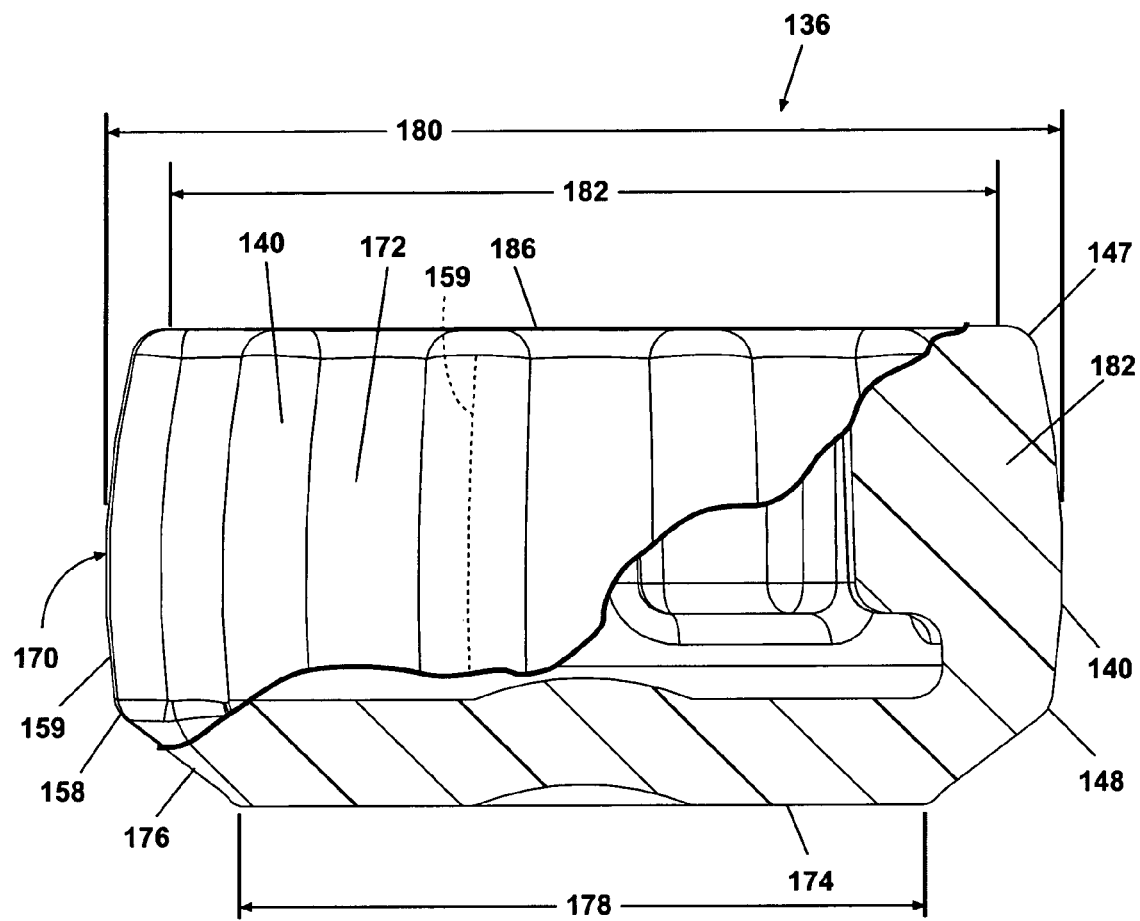
FIG. 6 is a part cutaway, part side-sectional view of the male coupler illustrated in FIG. 5.

Referring also to FIG. 6, the tip 159 extends in an arcuate line between a lower edge 148 and an upper edge 147. The lower edge 148 is formed at a junction of the perimeter surface 170 with the beveled wall 176. The upper edge 147 is formed at the junction of the top wall 186 and the perimeter surface 170.

The tips 159 of the splines have an arcuate profile. The radius of curvature of the tip 159 is selected such that the upper and lower edges 147, 148 do not touch the inner surface 156 of the female coupler 154 within the anticipated extent of misalignment between the first and second rotational axes 42, 64. The radius of curvature is also selected to ensure sufficient radial overlap between the male coupler splines 140 and the female coupler splines 158. The overlap will ensure proper meshing of the splines 140, 158. The longitudinal recesses 172 also have an arcuate profile with a radius of curvature generally equal to the radius of curvature of the arcuate splines 140.

Figure 5A:
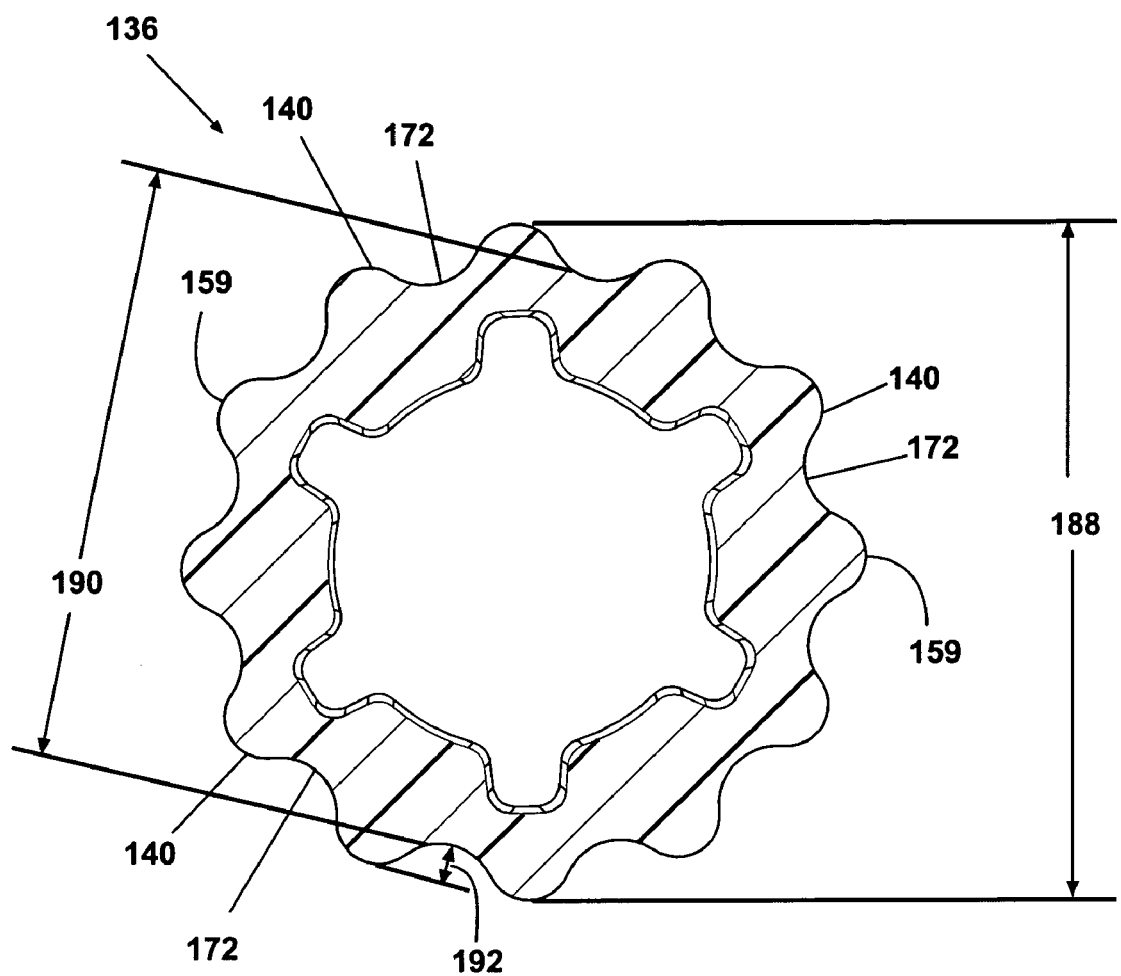
FIG. 5A is a sectional view of the male coupler taken along section line 5A-5A of FIG. 5.

FIG. 5A illustrates the diameters of the male coupler 136 associated with the splines 140 and the recesses 172. The diameter across the splines 140 comprises an outer diameter 188. The diameter across the recesses 172 comprises an inner diameter 190. Half the difference between the outer diameter 188 and the inner diameter 190 is the height of the splines 140. As an example, a blender assembly for home kitchen use may utilize a male coupler 136 having a height of 0.45 inches, an outer diameter 188 of 0.89 inch, an inner diameter 190 of 0.767 inch, and a spline height of 0.06 inch. A suitable radius of curvature of the tip 159 for a male coupler 136 having these dimensions will be 0.85 inch. It has been found that this radius of curvature can vary between 0.8 inch and 2.0 inches to accommodate misalignment of the first and second axes 42, 64 of between 8° and 3°, respectively. The dimensions of the male coupler 136 (and by implication the female coupler 154) can be varied to accommodate variations in appliance size and type, and a drive coupler appropriate for such an appliance. Dimensional variations may include variations in the radius of curvature, coupler height, and inner and outer diameters.

Thus, for the illustrated embodiment of the invention, a suitable radius of curvature is 0.85 inch, but can vary between 0.8 inch and 2.0 inches for an anticipated range of misalignment for the first and second axes 42, 64 of up to 8°. Of course, these ranges are related to the particular size and shape of the illustrated male and female couplers. The invention is not limited to these specific ranges, and additional radii for other ranges of misalignment are within the scope of the invention.

Figure 1A:
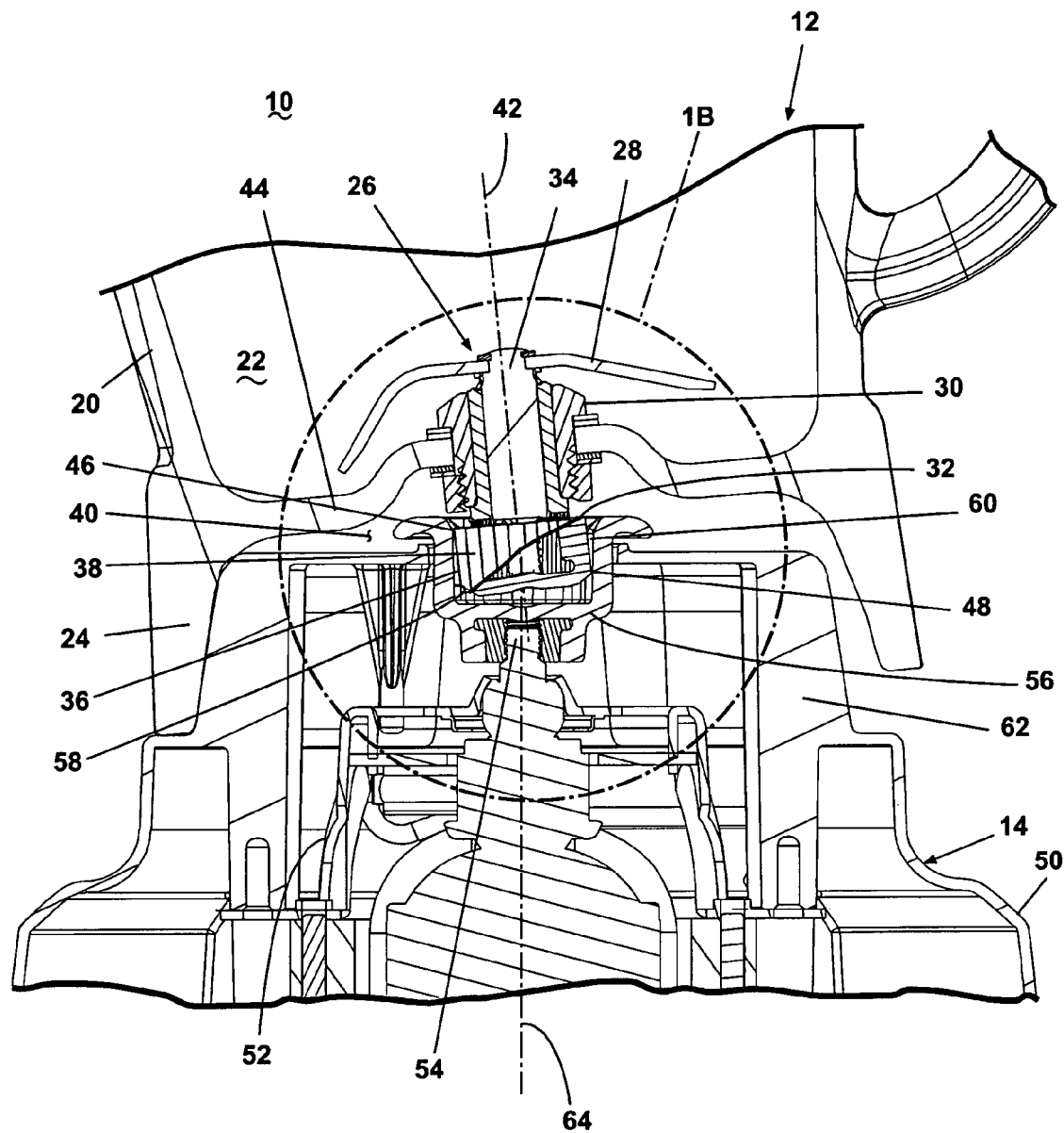
FIG. 1A is a sectional view of a portion of a prior art blender comprising a jar and a motorized base, the jar having a male coupler for driving a rotating blade assembly in the jar and adapted for cooperative registry with a female coupler driven by a motor in the motorized base.
Figure 1B:
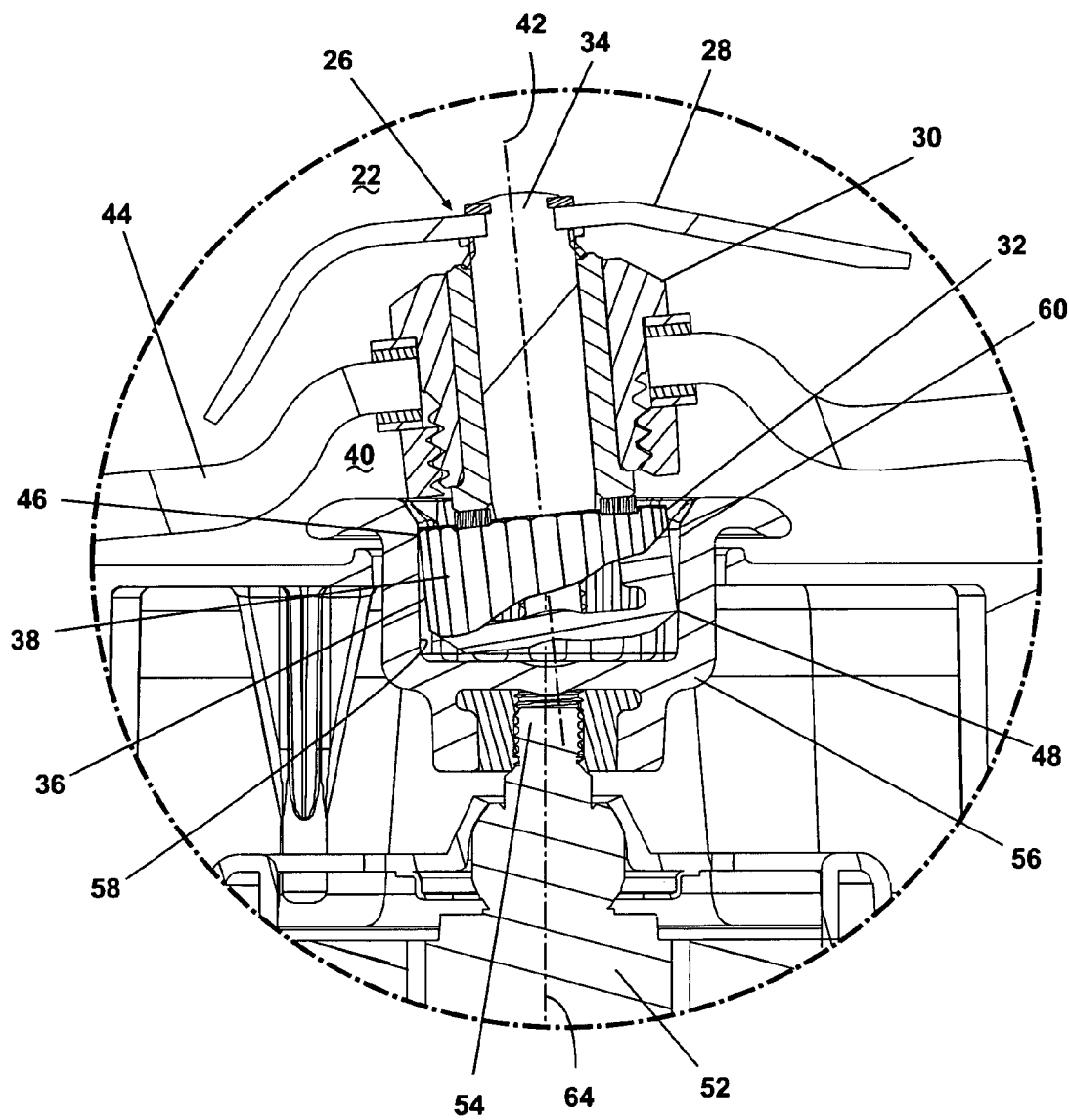
FIG. 1B is an enlarged view of a portion of FIG. 1 to better illustrate the male and female couplers.
Figure 7:
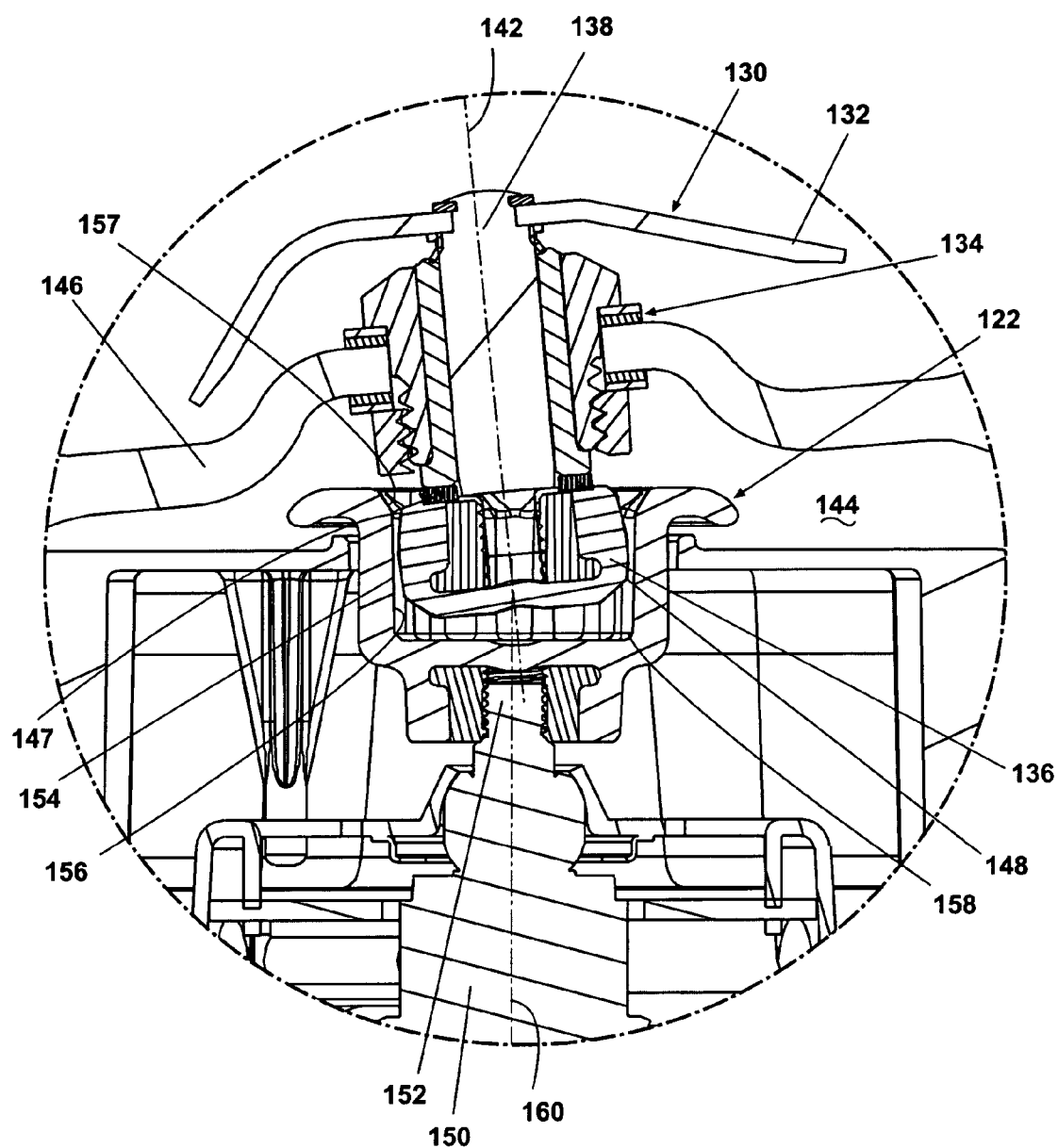
FIG. 7 is an enlarged portion of the sectional view of FIG. 3 but illustrating the cooperative registry of the male coupler with the female coupler when the jar is misaligned with the motorized base.

Referring now to FIG. 7, the blender assembly 100 is illustrated with the jar 102 mounted to the motorized base 104 so that the drive shaft rotational axis 142 and the output shaft rotational axis 160 are misaligned and not coaxial. While the rotation axes are misaligned, the arcuate male coupler 136 is fully received in the female coupler 154 without either the upper or lower edges 147, 148 contacting the inner surface 156 of the female coupler thereby preventing the binding and noise experienced with a misaligned conventional blender assembly, as illustrated in FIG. 1. The arcuate profile of the male coupler splines 140 enables complete operable engagement of the male coupler 136 with the female coupler 154 notwithstanding the misalignment of the jar 102 with the motorized base 104. Consequently, torque developed by the drive motor 150 may be delivered to the blade assembly 130 without relative slippage between the arcuate male coupler 136 and the female coupler 154. Furthermore, the positive registry of the male coupler 136 with the female coupler 154 as a consequence of the arcuate spline profile, and the absence of binding between the male coupler 136 and the female coupler 154, may reduce the vibration and noise experienced with the prior art blender assembly. The arcuate profile of the male coupler 136 may also correct misalignment of the male coupler 136 and the female coupler 154 by facilitating proper alignment and seating of the male coupler 136 in the female coupler 154 after the blender 100 has been assembled and the drive coupler 122 has started to rotate. Finally, the smooth operational interaction of the male and female couplers 136, 154 reduces wear and premature failure of these elements.

While the invention has been described and illustrated herein with respect to a blender assembly, the invention is also applicable to other food preparation devices, such as food processors, hand mixers, stand mixers, coffee grinders and mills, nut meat grinders, spice grinders, and the like.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A food preparation device comprising:
    a base comprising a motor located within the base and having an output shaft defining a first axis of rotation;
    a jar removably coupled with the base;
    a food processing assembly coupled with the jar and having a drive shaft defining a second axis of rotation;
    a drive coupler comprising a splined socket coupled with one of the output shaft and the drive shaft; and
        a splined insert coupled with the other of the output shaft and the drive shaft, the splined insert sized to be received within the splined socket when the jar is mounted to the base to operably couple the output shaft and the drive shaft, the splines of one of the splined insert and the splined socket having an arcuate profile, wherein the splined insert is fully received in the splined socket without an upper and lower edge of the splined insert contacting an inner surface of the splined socket, thereby preventing binding and noise due to misalignment.

2. The food preparation device according to claim 1 wherein the splined insert is coupled with the drive shaft.

3. The food preparation device according to claim 1 wherein one portion of the drive shaft extends into an interior space defined by the jar, a second portion of the drive shaft extends exteriorly of the jar, the one of the splined socket and splined insert is coupled with the second portion of the drive shaft, and the food processing assembly further comprises a blade coupled with the one portion of the drive shaft.

4. The food preparation device according to claim 1 and further comprising a beveled surface on one of the splined insert and the splined socket to facilitate coupling of the splined insert with the splined socket.

5. The food preparation device according to claim 1 wherein the arcuate profile has a radius of curvature of 0.8 inch to 2.0 inches.

6. The food preparation device according to claim 5 wherein the arcuate profile of the splines for the splined insert is selected to permit up to 8 degrees of misalignment between the first and second axes of rotation while still permitting the operable coupling of the output shaft and drive shaft.

7. The food preparation device according to claim 1 wherein the splined insert comprises a hub with radially extending teeth forming the splines for the splined insert.

8. The food preparation device according to claim 7 wherein the splined socket comprises a cup with radially extending teeth forming the splines for the splined socket.

9. A food preparation device according to claim 1
    wherein the splined insert comprises a ball with splines and splined socket receives the ball to from a ball and socket coupler for operably coupling the output shaft and the drive shaft when the jar is coupled with the base.

10. The food preparation device according to claim 9 wherein the ball is coupled with the drive shaft.

11. The food preparation device according to claim 9 wherein one portion of the drive shaft extends into an interior space defined by the jar, a second portion of the drive shaft extends exteriorly of the jar, the one of the socket and ball is coupled with the second portion of the drive shaft, and the blade assembly further comprises a blade coupled with the one portion of the drive shaft.

12. The food preparation device according to claim 9 wherein the profile of the splines is selected to permit up to 8 degrees of misalignment between the first and second axes of rotation while still permitting the operable coupling of the output shaft and drive shaft.

13. The food preparation device according to claim 9 wherein the arcuate profile is formed by a curve having a radius of curvature of 0.8 inch to 2.0 inches.

14. The food preparation device according to claim 9 wherein the socket comprises a cup with radially inwardly extending splines.

15. The food preparation device according to claim 14 wherein the splines of the cup terminate in a tip having a straight profile.

16. The food preparation device according to claim 9 and further comprising a beveled surface on one of the ball and the socket to facilitate coupling of the ball with the socket.

17. The food preparation device according to claim 1 wherein the splines terminate in a tip with an arcuate profile.

* * * * *